United States Patent [19]

Katoh

[11] Patent Number: 5,085,050

[45] Date of Patent: Feb. 4, 1992

[54] EXHAUST GAS PURIFICATION SYSTEM FOR AN INTERNAL COMBUSTION ENGINE USING ALCOHOL BLENDED GASOLINE FOR FUEL

[75] Inventor: Kenji Katoh, Sunto, Japan

[73] Assignee: Toyota Jidosha Kabushiki Kaisha, Toyota, Japan

[21] Appl. No.: 618,659

[22] Filed: Nov. 27, 1990

[30] Foreign Application Priority Data

Dec. 1, 1989 [JP] Japan .................................. 1-310570

[51] Int. Cl.$^5$ .............................................. F01N 3/20
[52] U.S. Cl. ........................................ 60/288; 60/298
[58] Field of Search ................................ 60/288, 298

[56] References Cited

U.S. PATENT DOCUMENTS

| 3,817,031 | 6/1974 | Goto et al. | 60/288 |
|---|---|---|---|
| 4,331,644 | 5/1982 | Ritscher . | |
| 4,770,129 | 9/1988 | Miyata et al. | 123/1 A |
| 4,817,385 | 4/1989 | Kumagai | 60/288 |
| 4,913,099 | 4/1990 | Ota | 123/478 |

FOREIGN PATENT DOCUMENTS

| 56-66424 | 6/1981 | Japan . | |
| 57-76231 | 5/1982 | Japan . | |
| 210116 | 12/1982 | Japan . | 60/288 |
| 1-130735 | 5/1989 | Japan . | |
| 1-135541 | 5/1989 | Japan . | |
| 01-139145 | 5/1989 | Japan . | |
| 1-171625 | 7/1989 | Japan . | |
| 1-262311 | 10/1989 | Japan . | |
| 1-266854 | 10/1989 | Japan . | |
| 02-199214 | 8/1990 | Japan . | |

OTHER PUBLICATIONS

Zeolites, 1985, vol. 5, Sep.

Primary Examiner—Douglas Hart
Attorney, Agent, or Firm—Kenyon & Kenyon

[57] ABSTRACT

An exhaust gas purification system for an internal combustion engine using an alcohol blended gasoline fuel includes a lean NOx catalyst capable of reducing nitrogen oxides under an oxidizing gas condition and in the presence of hydrocarbons. A bypass conduit is provided with a bypass valve so as to bypass the lean NOx catalyst. Opening of the bypass valve to cause the exhaust gas to flow through the bypass conduit is controlled in accordance with the alcohol concentration of the fuel. When the alcohol concentration is low, the bypass valve opening range is limited to a high engine speed and high engine load range, so that the exhaust gas is caused to flow through the lean NOx catalyst at low and medium engine speeds and low and medium engine loads, and the catalyst is utilized at a maximum. On the other hand, when the alcohol concentration is high, the bypass valve opening range is determined so as to include a medium to high engine speed and medium to high engine load range, so that the exhaust gas is caused to flow through the bypass conduit at medium engine speeds and medium engine loads, and useless degradation of the lean NOx catalyst is prevented.

8 Claims, 4 Drawing Sheets

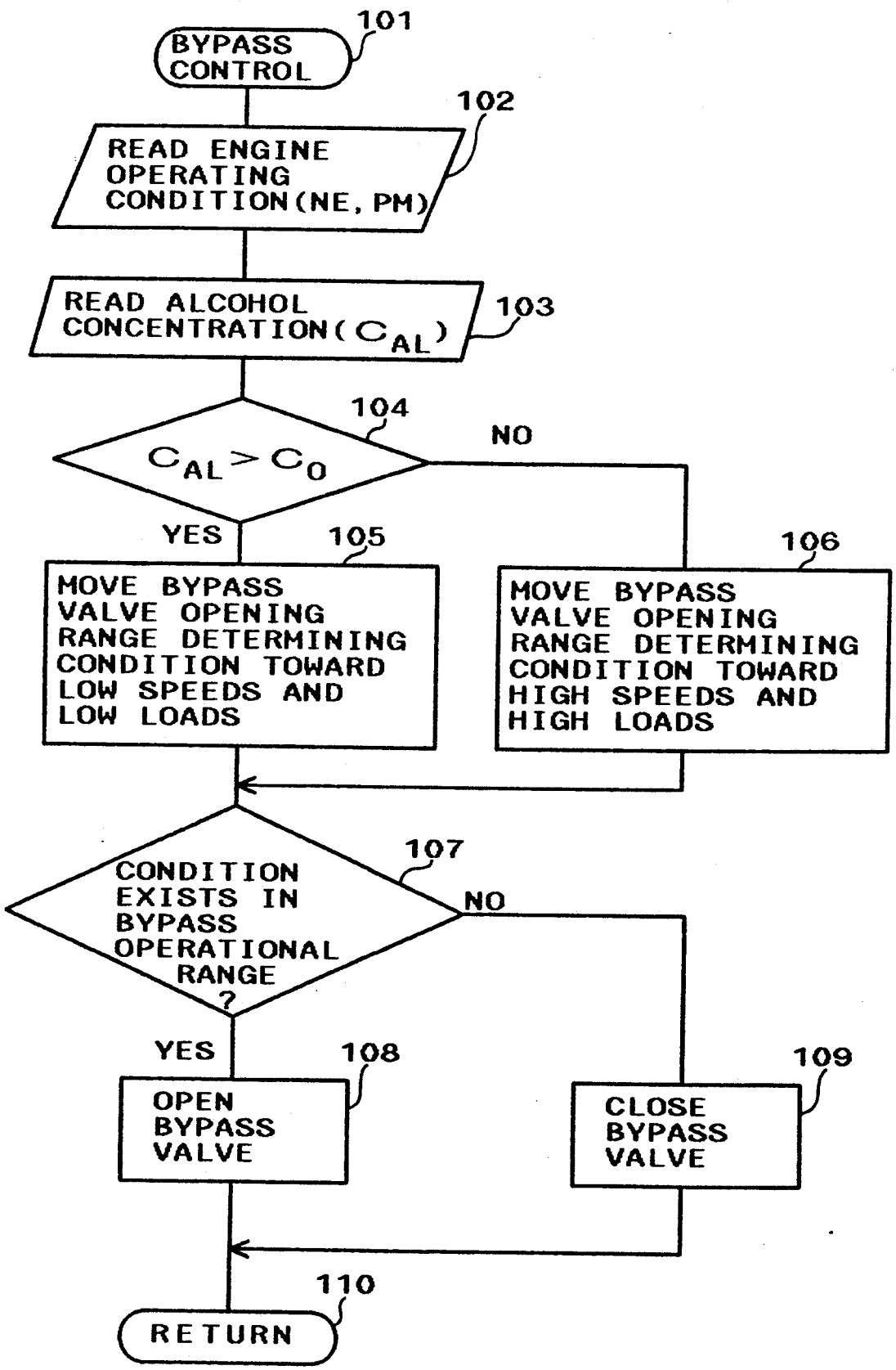

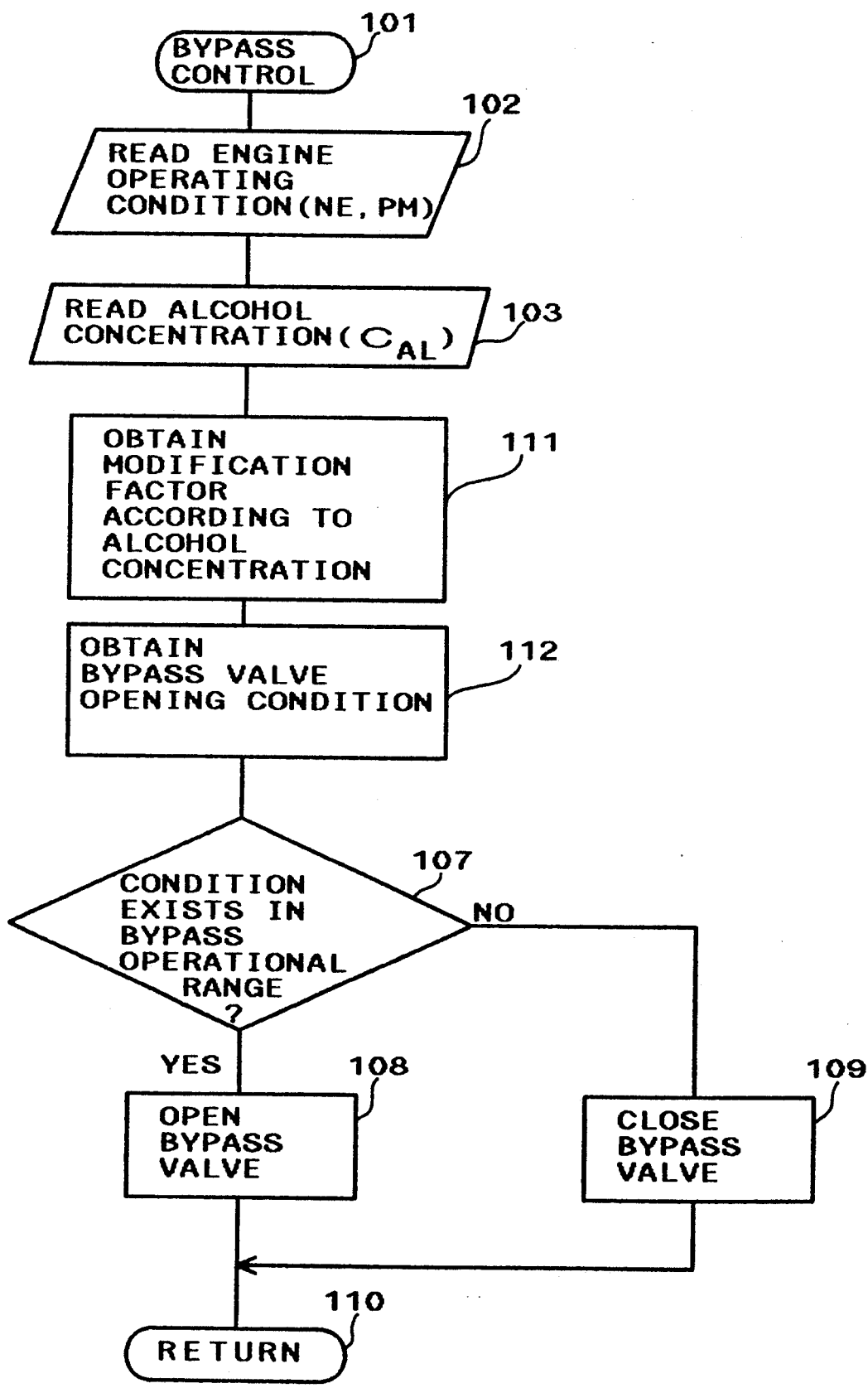

EXHAUST GAS PURIFICATION SYSTEM FOR AN INTERNAL COMBUSTION ENGINE USING ALCOHOL BLENDED GASOLINE FOR FUEL

BACKGROUND OF THE INVENTION

1. Field of the Invention

The present invention relates to an exhaust gas purification system for an internal combustion engine which uses alcohol blended gasoline for fuel and is operable at various blend ratios of alcohol to gasoline.

2. Description of the Prior Art

Though alcohol is a prospective future fuel for vehicles, a flexible fuel vehicle using alcohol blended gasoline and operable at various blend ratios of alcohol to gasoline has been developed as an actual solution at present. For example, Japanese Patent Publications SHO 56-66424 and SHO 57-76231 disclose such engines using alcohol blended gasoline as a fuel.

As a measure to counter environmental pollution due to NOx included in exhaust gas of vehicle engines, a catalyst constructed of zeolite carrying transition metals and capable of reducing NOx under an oxidizing gas condition in the presence of hydrocarbons also is now developed. However, the conventional zeolite catalyst has insufficient heat resistance and durability. To improve durability, Japanese Patent Publication HEI 1-130735 proposes to provide a fixed engine operating range in which degradation of the zeolite catalyst is prevented by shielding the catalyst from the exhaust gas.

When investigating the feasibility of installing such a zeolite catalyst in the exhaust line of an internal combustion engine operated on an alcohol blended gasoline fuel and to counter degradation of the catalyst by providing a fixed operational range to prevent degradation of the catalyst, it is difficult to achieve both high NOx reduction due to the catalyst and sufficient durability of the catalyst.

More particularly, the NOx reduction characteristic of the zeolite catalyst is strongly affected by the kinds of hydrocarbons included in the exhaust gas, and these are a function of the concentration of alcohol in the alcohol blended gasoline. For example, methyl alcohol, which has a single carbon atom (i.e. its carbon number is 1) has little effect in causing the catalyst to reduce NOx; so a high concentration of methyl alcohol in the fuel significantly decreases the NOx reduction rate of the catalyst. Therefore, if a fixed degradation prevention operating range is established so as to effectively utilize the catalyst on the basis of a fuel with low concentration of alcohol, little NOx will be reduced when a fuel with high concentration of alcohol is used. If the exhaust gas continues to flow through the catalyst despite the catalyst having little NOx reducing effect, the catalyst will uselessly be degraded. On the other hand, if a fixed degradation prevention operating range is established so as to effectively prevent the degradation of the catalyst on the basis of a fuel with high concentration of alcohol, the catalyst will be shielded from the exhaust gas at medium engine speeds and medium engine loads, even when a fuel with low concentration of alcohol is used. Therefore, the catalyst will not be effectively utilized, and a relatively great amount of NOx will be exhausted into the atmosphere at medium engine speeds and medium engine loads.

SUMMARY OF THE INVENTION

An object of the invention is to provide an exhaust gas zeolite catalyst purification system for an internal combustion engine using alcohol blended gasoline for a fuel wherein the zeolite catalyst is utilized effectively, yet the durability of the catalyst is maximized.

To attain the above-described object, in the present invention, a bypass operational range (where engine exhaust gas is caused to bypass a zeolite catalyst) is changed in accordance with the concentration of alcohol in alcohol blended gasoline. More particularly, when the alcohol concentration is low, a large portion of the hydrocarbons in the exhaust gas are derived from gasoline and have a high carbon number, which improves the effectiveness of NOx reduction by the zeolite catalyst. In this condition, the by-pass operational range is limited to high engine speeds and high engine loads, where only the most serious catalyst degradation occurs. As a result, a high NOx purification rate can be obtained over a wide engine operating range. On the other hand, when the alcohol concentration is high, the bypass operational range is increased to include medium to high engine speeds and medium to high engine loads. As a result, when the engine exhaust gas includes a large portion of hydrocarbons with a low carbon number generated from alcohol, the exhaust gas is caused to bypass the catalyst from relatively low engine speeds and low engine loads to prevent the catalyst from being uselessly degraded. In this instance, since NOx quantity generated from alcohol is about one half that generated from gasoline, no problem will happen though the exhaust gas is caused to bypass the catalyst in the case of a fuel with high alcohol concentration.

BRIEF DESCRIPTION OF THE DRAWINGS

The above and other objects, features, and advantages of the present invention will become more apparent and will become readily appreciated from the following detailed description of the preferred embodiments of the invention taken in conjunction with the accompanying drawings, in which:

FIG. 2A is a flow chart illustrating an exhaust gas purification control in accordance with a first embodiment of the present invention;

FIG. 2B is a flow chart illustrating an exhaust gas purification control in accordance with a second embodiment of the present invention:

DETAILED DESCRIPTION OF THE PREFERRED EMBODIMENTS

Figure 1:
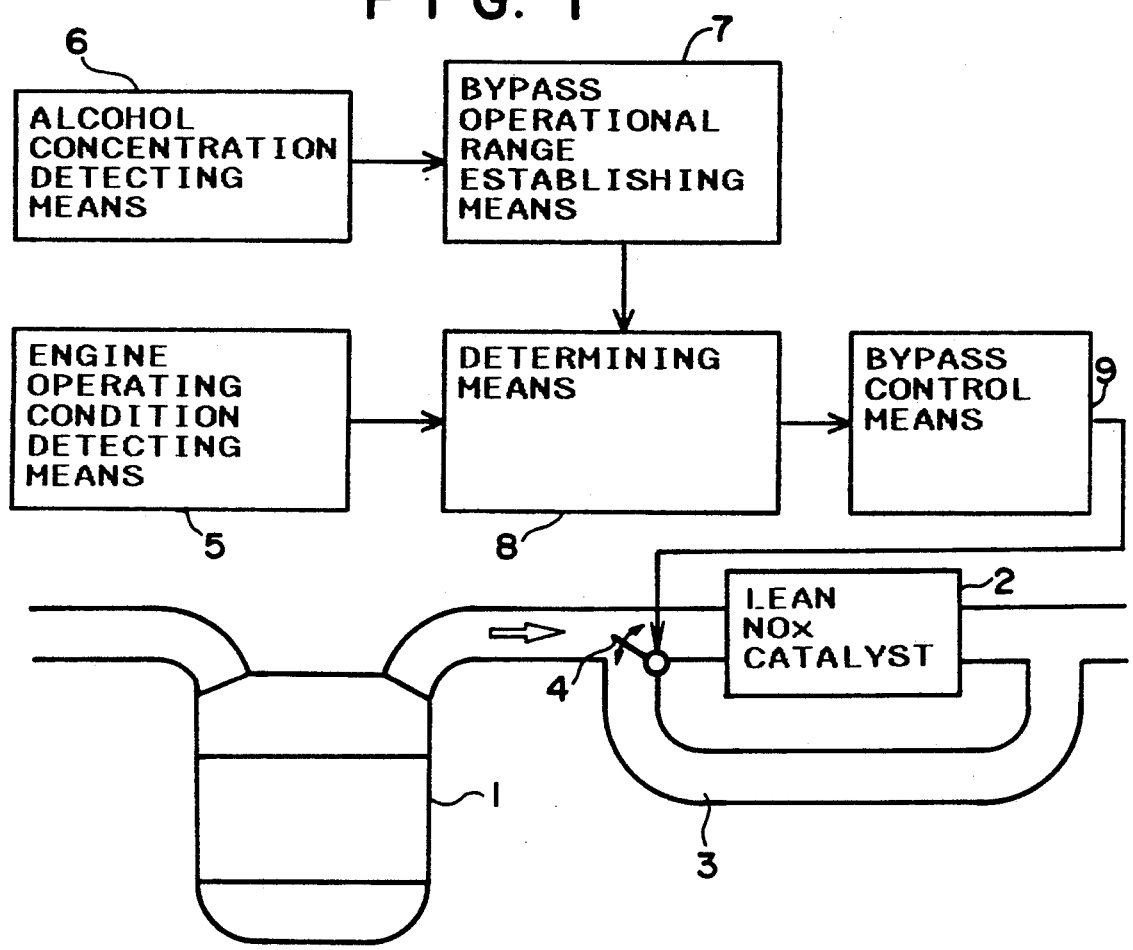
FIG. 1 is a block diagram of a system for controlling exhaust gas purification for an internal combustion engine in accordance with the present invention.

As illustrated in FIG. 1, an exhaust gas purification system for an internal combustion engine in accordance with the invention generally includes an internal combustion engine 1 using alcohol blended gasoline for the fuel thereof and operable at various blend ratios of alcohol to gasoline, a catalyst 2 installed in an exhaust conduit of the engine and constructed of zeolite carrying at least one metal selected from transition metals and noble metals to reduce nitrogen oxides included in the exhaust gas from the engine 1 under an oxidizing gas condition and in the presence of hydrocarbons (which will be called a lean NOx catalyst hereinafter), a bypass conduit 3 connected to the exhaust conduit so as to bypass the lean NOx catalyst 2, and a bypass valve 4 adapted to switch flow of the exhaust gas between the lean NOx catalyst 2 and the bypass conduit 3. The exhaust gas purification system further includes engine operating condition detecting means 5 for detecting various operating conditions of the engine 1, alcohol concentration detecting means 6 for detecting alcohol concentration of the fuel, bypass operational range establishing means 7 for establishing an operational range where the exhaust gas is caused to bypass the lean NOx catalyst 2 in accordance with the alcohol concentration, determining means 8 for determining whether or not the detected engine operating condition is within the established bypass operational range, and bypass control means 9 for switching the bypass valve 4 between a first position causing the exhaust gas to flow through the bypass conduit 3 when the engine operating condition is determined to be within the established bypass operational range and a second position causing the exhaust gas to flow through the lean NOx catalyst 2 when the engine operating condition is determined to be outside the established bypass operational range.

Figure 4:
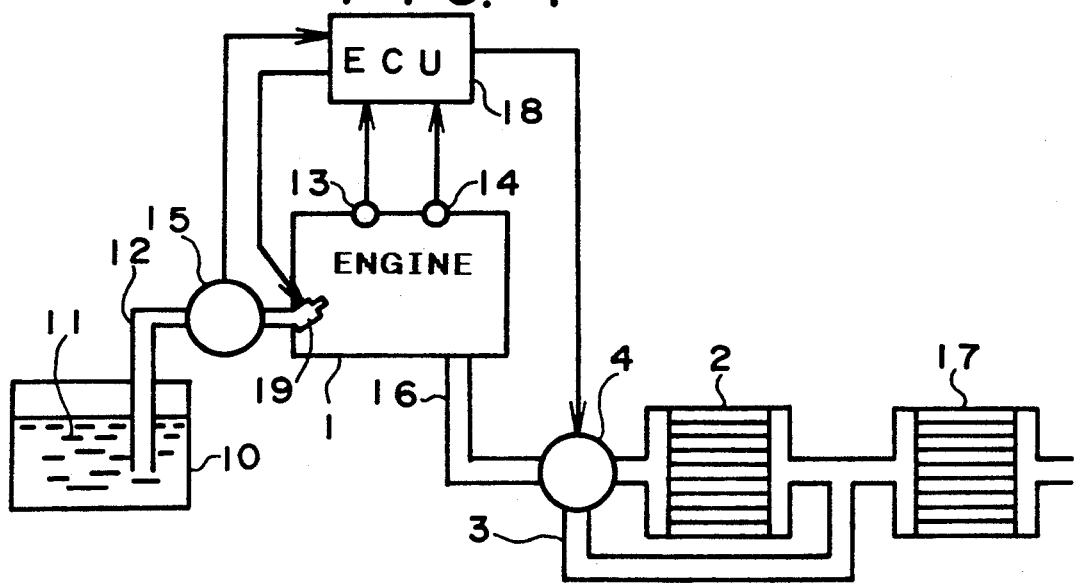
FIG. 4 is a schematic system diagram in accordance with the present invention.

FIG. 4 illustrates the system in more detail. As illustrated in FIG. 4, an alcohol blended gasoline fuel 11 in a fuel tank 10 is supplied to the engine 1 via a fuel pipe 12 and is injected into an intake path or a cylinder of the engine 1 through a fuel injection valve 19. An alcohol concentration detecting sensor 15 for sensing the alcohol concentration of the alcohol/gasoline fuel is installed in the fuel pipe 12. The alcohol concentration detecting means 6 of FIG. 1 includes, for example, the alcohol concentration detecting sensor 15 of FIG. 4. Further, an engine speed detecting sensor 13 for detecting an engine rotational speed (NE) and an engine load detecting sensor 14 for detecting an engine load (PM) are provided to the engine 1. The sensor 13 includes, for example, a crank angle detecting sensor, and the sensor 14 includes, for example, an intake pressure detecting sensor installed in an intake pipe downstream of a throttle valve. These sensors 13 and 14 constitute the engine operating condition detecting sensor 5 of FIG. 1. Also, a three-way catalyst 17 may be provided in a portion of an exhaust pipe downstream of the lean NOx catalyst 2, but the three-way catalyst 17 is not essential.

As illustrated in FIG. 4, the sensors 13, 14, and 15 and an actuator for the by-pass valve 4 are electrically connected to an engine control unit 18 (hereinafter, ECU) composed of a micro computer. The ECU 18 includes (not shown) an analog/digital converter for converting the analog signals from the sensors 14 and 15 to digital signals, an input/output interface for receiving the signals from the sensors 13, 14, and 15 and sending the output signals to the bypass valve 4 and the fuel injection valve 19, a read-only memory (ROM), a random access memory (RAM), and a central processor unit (CPU) for executing various calculations. The ROM stores the program shown in FIG. 2A or FIG. 2B. The CPU reads the program from the ROM and executes the commands of the program.

FIG. 2A corresponds to the first embodiment of the invention and FIG. 2B corresponds to the second embodiment of the invention.

The control in accordance with the first embodiment will now be explained with reference to FIG. 2A. The routine is entered at step 101 at intervals. Then, at step 102, the engine speed NE from the crank angle sensor 13 and the engine load PM from the intake pressure sensor 14 are read to know the current engine operating condition. Also, at step 103, the alcohol concentration $C_{AL}$ from the alcohol concentration detecting sensor 15 is read to know the alcohol concentration of the alcohol/gasoline fuel in use. The order of the steps 103 and 104 may be inverted.

Then, the routine proceeds to a step 104. At step 104, whether or not the alcohol concentration $C_{AL}$ read at step 103 is greater than a predetermined alcohol concentration $C_0$ (for example, 50%) is determined. When $C_{AL}$ is greater than $C_0$, the fuel is deemed to be a fuel of high alcohol concentration, and when $C_{AL}$ is equal to or less than $C_0$, the fuel is deemed to be a fuel of low alcohol concentration. NOx quantity generated from alcohol is about one half that from gasoline. Further, the hydrocarbons existing in the exhaust gas of the engine using pure alcohol include mainly a hydrocarbon with carbon number of 1, that is, methyl alcohol which has little effect in causing the lean NOx catalyst to reduce NOx. More particularly, in the case of a fuel with high alcohol concentration, the quantity of NOx exhausted into the environment is very small, and the NOx purification rate in the presence of hydrocarbon generated from alcohol is low. On the other hand, in the case of a fuel with low alcohol concentration, the NOx quantity is relatively great, and the NOx purification rate in the presence of hydrocarbons generated from gasoline is high.

Figure 3A:
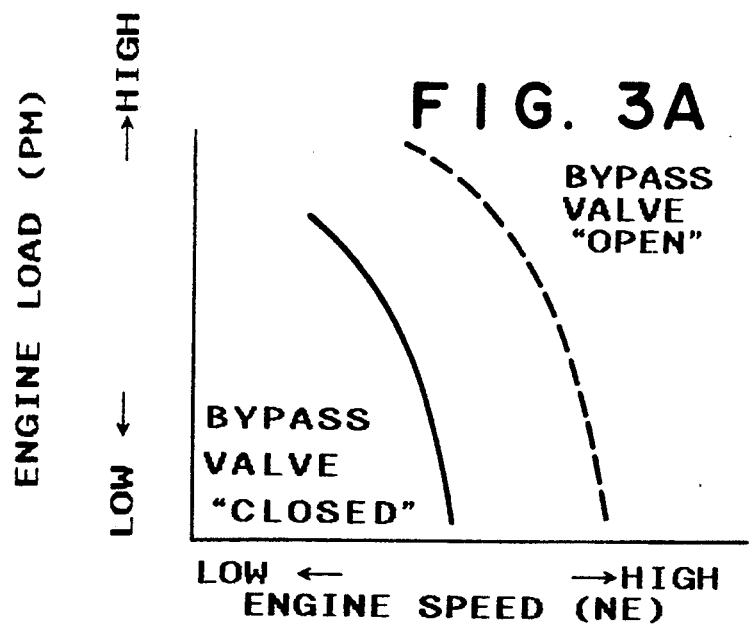
FIG. 3A is an engine load versus engine speed map illustrating change in a bypass operational range in accordance with the first embodiment of the present invention.

In order to utilize these characteristics, when $C_{AL}$ is determined to be greater than $C_0$ at step 104 and therefore the alcohol concentration is judged to be high, the routine proceeds to a step 105, where the condition for determining the range of opening of the bypass valve 4 is moved toward the engine low speeds and engine low loads as shown by a full line in FIG. 3A. On the other hand, when $C_{AL}$ is determined to be equal to or less than $C_0$ at step 104 and therefore the alcohol concentration is judged to be low, the routine proceeds to a step 106, where the condition for determining the range of opening of the bypass valve 4 is moved toward the engine high speeds and engine high loads as shown by a broken line in FIG. 3A.

In FIG. 3A, the range on the right side of the broken line is an engine operational range where the exhaust gas temperature is high and degradation of the lean NOx catalyst 2 is promoted. The range between the broken line and the full line is an engine operational range where the exhaust gas temperature is medium and therefore the degradation of the lean NOx catalyst 2 is not extremely great, but if the exhaust gas is caused to continuously and uselessly flow through the lean NOx catalyst 2, the degradation of the lean NOx catalyst 2 will not be negligible. The range on the left side of the full line is an engine operational range where the exhaust gas temperature is relatively low and therefore a thermal degradation of the lean NOx catalyst 2 is not promoted and is actually negligible. Since the program includes the steps 104, 105, and 106, the condition for opening the bypass valve 4 can be changed between the two positions of the full line and the broken line of FIG. 3A. Accordingly, in the first embodiment, the means of the steps 104, 105, and 106 constitute the bypass operational range establishing means 7 of FIG. 1.

After the bypass operational range is established at step 105 or step 106, the routine proceeds to a step 107. At step 107, whether or not the current engine operating condition defined as a cross-point of NE and PM read at step 102 exists within the established bypass operational range (bypass valve opening range) of FIG. 3A is determined. The means of step 107 constitutes the determining means 8 of FIG. 1.

When the engine operating condition is determined to be within the established bypass operational range at step 107, the routine proceeds to a step 108, where the bypass valve 4 is opened or is switched to open. More particularly, at step 107, an instruction signal to open the valve is sent from ECU 18 to the actuator of the bypass valve 4, and the actuator opens the bypass valve 4. When the engine operating condition is determined to be outside the established bypass operational range at step 107, the routine proceeds to a step 109, where the bypass valve 4 is closed or is switched to be closed. The means of the steps 108 and 109 constitute the bypass control means 9 of FIG. 1. Then, the routine proceeds to a step 110 and returns to another routine.

FIG. 2B illustrates the routine in accordance with the second embodiment of the present invention. In the second embodiment, the bypass operational range defining line is gradually changed, while in the first embodiment the bypass operational range defining line is switched between the two positions. The points where the second embodiment differs from the first embodiment are that the steps 104, 105 and 106 of FIG. 2A in the first embodiment are replaced by steps 111 and 112 of FIG. 2B in the second embodiment and that the map of FIG. 3A in the first embodiment is replaced by a map of FIG. 3B in the second embodiment and a map 3C is added. Since other points are the same as with the first embodiment, description of like elements is omitted by denoting the like elements with like reference numerals, and only different points will be explained below.

In the second embodiment, as illustrated in FIG. 2B, after the alcohol concentration $C_{AL}$ is read at step 103, the routine proceeds to a step 111. At step 111, a modification factor "alpha" for modifying the bypass valve opening determining condition is obtained from the modification factor versus alcohol concentration map of FIG. 3C. The modification factor "alpha" is equal to zero when the alcohol concentration $C_{AL}$ is equal to a basic concentration $C_0$, and the factor "alpha" is negative when $C_{AL}$ is greater than $C_0$ and the factor "alpha" is positive when $C_{AL}$ is smaller than $C_0$. Then, the routine proceeds to a step 112 where the bypass valve opening determining condition corresponding to the alcohol concentration $C_0$ is modified by adding the modification factor "alpha". In this instance, when "alpha" is positive, the bypass valve opening determining line is moved toward the right in FIG. 3B, and when "alpha" is negative, the bypass valve opening determining line is moved toward the left in FIG. 3B. More particularly, when the alcohol concentration is high, the factor "alpha" is negative and the bypass valve opening determining line is moved toward the left in FIG. 3B, and when the alcohol concentration is low, the bypass valve opening determining line is moved toward the right in FIG. 3B. In this instance, the line moves smoothly according to the alcohol concentration. Then, the routine proceeds to a step 107. From step 107 to step 110, the same control as discussed in the first embodiment will be executed.

The operation of the present invention will now be explained. The alcohol blended gasoline fuel 11 from the fuel tank 10 is injected through the fuel injection valve 19 to be burned at the injection timing and quantity determined by ECU 18 taking the engine operating conditions and alcohol concentration into account. The exhaust gas from the engine is exhausted to the atmosphere through the exhaust pipe 16 and the lean NOx catalyst 2 or the by-pass conduit 3, and also through the three-way catalyst 17 in the case where the three-way catalyst 17 is provided.

Whether the exhaust gas flows through the lean NOx catalyst 2 or through the bypass conduit 3 is controlled by the bypass valve 4, and switching of the bypass valve 4 is controlled by the ECU 18 taking the engine operating conditions NE and PM and the alcohol concentration $C_{AL}$ into account.

Figure 3B:
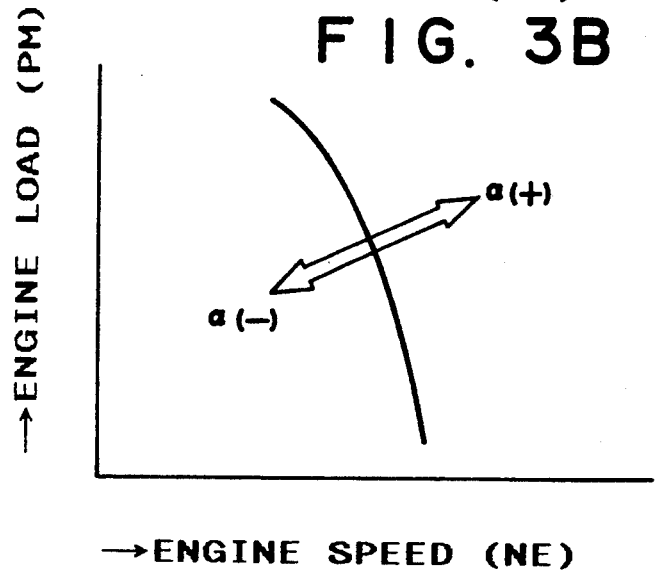
FIG. 3B is an engine load versus engine speed map illustrating change in a bypass operational range in accordance with the second embodiment of the present invention.
Figure 3C:
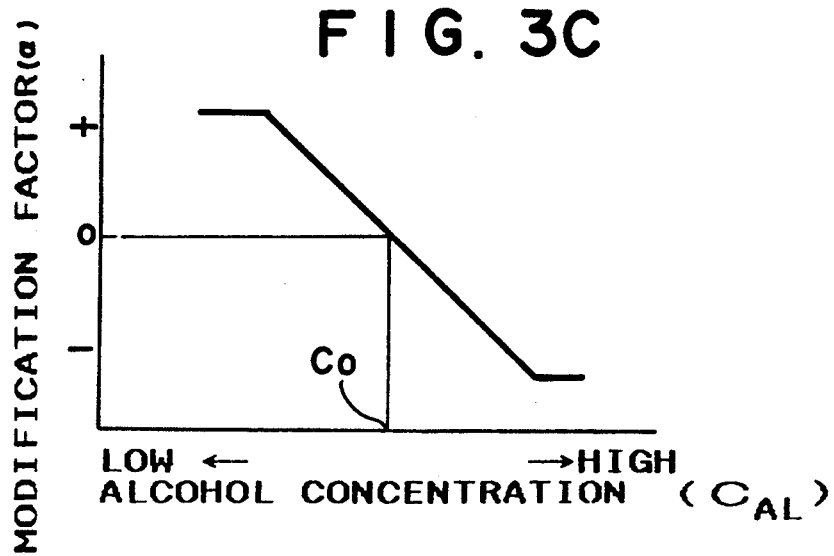
FIG. 3C is a modification factor versus alcohol concentration map for use in determining a modification factor for a bypass valve opening determining condition.

More particularly, when the alcohol concentration $C_{AL}$ is greater than the predetermined concentration $C_0$, the bypass operating range where the exhaust gas is caused to flow through the bypass conduit 3 is enlarged toward the low engine speeds and low engine loads in FIG. 3B, so that the bypass valve 4 opens for all operating conditions above low engine speeds and low engine loads. Since NOx quantity generated in the exhaust gas is small when the alcohol concentration is high, there is no problem from the viewpoint of NOx regulation, even though the exhaust gas is not caused to flow through the lean NOx catalyst 2. If the bypass opening determining condition comprised the broken line of FIG. 3A and a fuel of high alcohol concentration were caused to flow through the lean NOx catalyst, the lean NOx catalyst would uselessly be degraded in a relatively short period of time at the range between the full line and the broken line of FIG. 3A. However, in the present invention, since the bypass opening determining condition line in the case of a high alcohol concentration fuel is established at the full line in FIG. 3A, useless degradation of the lean NOx catalyst at the range between the full line and the broken line is prevented.

On the other hand, when the alcohol concentration $C_{AL}$ is lower than the predetermined value $C_0$, the bypass operational range is shrunk toward high engine speeds and high engine loads, so that the bypass valve 4 is opened only at high engine speeds and high engine loads. Therefore, since the entire amount of exhaust gas is caused to flow through the lean NOx catalyst 2 at low to medium engine speeds and low to medium engine loads, the lean NOx catalyst 2 is utilized over a large engine operating range including the range between the full line and the broken line in FIG. 3A and is effectively utilized.

In accordance with the present invention, the following advantages are obtained. When the alcohol concentration is low, the bypass operational range is shrunk toward high engine speeds and high engine loads, so that the lean NOx catalyst is utilized at its maximum using the high NOx reduction rate. In contrast, when the alcohol concentration is high, the bypass operational range is enlarged toward the low engine speeds and low engine loads so that useless introduction of the exhaust gas into the lean NOx catalyst is prevented to avoid unnecessary degradation of the catalyst. As a result, maximum utilization of the lean NOx catalyst and prevention of degradation of the lean NOx catalyst are both achieved.

Although only a few embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. An exhaust gas purification system for an internal combustion engine using alcohol blended gasoline for a fuel and operable at various blend ratios of alcohol to gasoline, the system comprising;
   a catalyst installed in an exhaust conduit of the engine and constructed of zeolite carrying at least one kind of metal selected from transition metals and noble metals to reduce nitrogen oxides included in exhaust gas from the engine under an oxidizing gas condition and in the presence of hydrocarbons;
   a bypass conduit connected to the exhaust conduit so as to bypass the catalyst;
   a bypass valve adapted to switch flow of the exhaust gas between the catalyst and the bypass conduit;
   engine operating condition detecting means for detecting various operating conditions of the engine;
   alcohol concentration detecting means for detecting alcohol concentration of a fuel used in the engine;
   bypass operational range establishing means for variably establishing a bypass operational range where the exhaust gas is caused to bypass the catalyst in response to the alcohol concentration detected by the alcohol concentration detecting means;
   determining means for determining whether or not the detected engine operating condition is within the established bypass operational range; and
   bypass control means for switching the bypass valve between causing the exhaust gas to flow through the bypass conduit when the engine operating condition is determined to be within the established bypass operational range and causing the exhaust gas to flow through the catalyst when the engine operating condition is determined to be outside the established bypass operational range.

2. The exhaust gas purification system according to claim 1, wherein the engine operating condition detecting means includes an engine speed detecting sensor and an engine load detecting sensor.

3. The exhaust gas purification system according to claim 1, and further comprising an engine control computer electrically connected with the bypass valve, the alcohol concentration detecting means, and the engine operating condition detecting means, the engine control computer storing a program which includes the bypass operating range establishing means, the determining means, and the bypass control means.

4. The exhaust gas purification system according to claim 1, wherein the bypass operational range establishing means includes first means for determining whether or not the alcohol concentration is higher than a predetermined alcohol concentration and second means for establishing the bypass operational range at high engine speeds and high engine loads when the alcohol concentration is determined to be higher than the predetermined alcohol concentration and establishing the bypass operational range at medium to high engine speeds and medium to high engine loads when the alcohol concentration is determined to be lower than the predetermined alcohol concentration.

5. The exhaust gas purification system according to claim 1, wherein the bypass operational range establishing means is adapted to selectively establish the bypass operational range as either one of a first range limited to high engine speeds and high engine loads and a second range including medium to high engine speeds and medium to high engine loads.

6. The exhaust gas purification system according to claim 1, wherein the bypass operational range establishing means is adapted to smoothly change the bypass operational range between a first range limited to high engine speeds and high engine loads and a second range including medium to high engine speeds and medium to high engine loads.

7. The exhaust gas purification system according to claim 1, further comprising a three-way catalyst which is installed downstream of the NOx reducing zeolite catalyst and downstream of the bypass conduit.

8. The exhaust gas purification system according to claim 1, wherein the alcohol blended gasoline includes methyl alcohol.

* * * * *